(12) United States Patent
Calkins et al.

(10) Patent No.: US 10,977,880 B2
(45) Date of Patent: Apr. 13, 2021

(54) HOVER TIME REMAINING FOR AN AIRCRAFT

(71) Applicant: General Electric Company, Schenectady, NY (US)

(72) Inventors: Steven Clark Calkins, Byfield, MA (US); David Carl Spillman, Shrewsbury, MA (US); Jacques Paul, Somerville, MA (US); Charles William Dowdell, Ipswich, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/609,119

(22) Filed: May 31, 2017

(65) Prior Publication Data

US 2018/0350166 A1    Dec. 6, 2018

(51) Int. Cl.
| | | |
|---|---|---|
| *G07C 5/08* | (2006.01) | |
| *B64C 27/00* | (2006.01) | |
| *B64D 45/00* | (2006.01) | |
| *G05B 13/02* | (2006.01) | |

(52) U.S. Cl.
CPC .......... *G07C 5/0808* (2013.01); *B64C 27/006* (2013.01); *B64D 45/00* (2013.01); *G05B 13/0265* (2013.01); *G07C 5/0816* (2013.01); *B64D 2045/0085* (2013.01); *G07C 5/0825* (2013.01); *G07C 5/0833* (2013.01)

(58) Field of Classification Search
CPC .. G07C 5/0808; G07C 5/0816; G07C 5/0825; G07C 5/0833; B64C 27/006; B64D 45/00; B64D 2045/0085; G05B 13/0265
See application file for complete search history.

(56) References Cited

U.S. PATENT DOCUMENTS

| | | | |
|---|---|---|---|
| 4,467,640 A | 8/1984 | Morrison | |
| 4,736,331 A * | 4/1988 | Lappos | B64D 43/00 701/14 |
| 5,459,666 A * | 10/1995 | Casper | G01C 23/00 340/973 |
| 6,453,669 B2 | 9/2002 | Kennedy et al. | |
| 6,885,917 B2 | 4/2005 | Osder et al. | |
| 7,031,812 B1 * | 4/2006 | Pettigrew | B64C 27/06 340/945 |
| 7,100,866 B2 * | 9/2006 | Rehkemper | A63H 27/12 244/17.13 |
| 7,309,208 B2 | 12/2007 | Hansen | |
| 7,414,544 B2 | 8/2008 | Oltheten et al. | |
| 7,631,834 B1 * | 12/2009 | Johnson | B64C 39/024 244/17.11 |

(Continued)

FOREIGN PATENT DOCUMENTS

| | | | | |
|---|---|---|---|---|
| EP | 2703985 A1 * | 3/2014 | | G06F 3/0227 |
| EP | 2703985 B1 * | 8/2018 | | G06F 3/03 |

(Continued)

*Primary Examiner* — Behrang Badii
*Assistant Examiner* — Jalal C Coduroglu
(74) *Attorney, Agent, or Firm* — Dority & Manning, P.A.

(57) ABSTRACT

Systems and methods are provided that include features for determining a hover time remaining for an aircraft performing a hover maneuver. In some exemplary embodiments, the hover time remaining can be communicated to a pilot or aircrew member.

20 Claims, 8 Drawing Sheets

(56) References Cited

U.S. PATENT DOCUMENTS

| | | | |
|---|---|---|---|
| 8,238,609 B2 * | 8/2012 | Lookingbill | G06K 9/2081 382/103 |
| 8,646,719 B2 * | 2/2014 | Morris | B64C 19/00 244/1 TD |
| 8,688,295 B2 | 4/2014 | Ellis et al. | |
| 8,825,235 B2 * | 9/2014 | Block | G01C 23/00 701/9 |
| 9,035,802 B2 * | 5/2015 | McCollough | B64C 27/04 340/946 |
| 9,091,545 B2 * | 7/2015 | Still | G01C 23/00 |
| 9,187,173 B2 * | 11/2015 | Morris | B64C 27/02 |
| 9,254,759 B1 * | 2/2016 | Henderson | H02N 15/02 |
| 9,335,835 B2 * | 5/2016 | Lee | G10L 13/00 |
| 9,340,278 B2 | 5/2016 | Hagerott et al. | |
| 9,352,849 B2 * | 5/2016 | McCollough | B60C 1/00 |
| 9,536,358 B2 * | 1/2017 | Germanetti | B64D 43/00 |
| 9,663,243 B2 * | 5/2017 | McCollough | B64C 27/04 |
| 10,589,857 B2 * | 3/2020 | Criado | G01R 31/58 |
| 10,589,858 B2 * | 3/2020 | Kovac | B64C 39/02 |
| 2006/0157615 A1 * | 7/2006 | Rehkemper | A63H 27/12 244/17.13 |
| 2013/0105635 A1 * | 5/2013 | Alzu'bi | B64C 39/024 244/23 A |
| 2013/0120165 A1 * | 5/2013 | McCollough | B64D 45/00 340/946 |
| 2015/0321769 A1 * | 11/2015 | McCollough | B64D 45/00 340/946 |
| 2015/0323930 A1 * | 11/2015 | Downey | G08G 5/006 701/2 |
| 2016/0196755 A1 * | 7/2016 | Navot | G08G 5/0086 701/4 |
| 2016/0272342 A1 * | 9/2016 | McCollough | B64C 27/04 |
| 2016/0327956 A1 * | 11/2016 | Zhang | G05D 1/005 |
| 2016/0349759 A1 * | 12/2016 | Shue | G05D 1/0676 |
| 2017/0017336 A1 * | 1/2017 | Mayumi | G06F 3/041662 |
| 2017/0028870 A1 * | 2/2017 | Nachtmann | B60L 15/002 |
| 2017/0066531 A1 * | 3/2017 | McAdoo | B64C 27/08 |
| 2017/0113799 A1 * | 4/2017 | Kovac | F03D 80/50 |
| 2017/0323385 A1 * | 11/2017 | Sivaramakrishnan | G06Q 40/06 |
| 2018/0297695 A1 * | 10/2018 | Ramirez-Serrano | B64C 27/08 |
| 2018/0350166 A1 * | 12/2018 | Calkins | G05B 13/0265 |
| 2020/0198782 A1 * | 6/2020 | Li | H04L 67/12 |
| 2020/0218270 A1 * | 7/2020 | Gu | G05D 1/0217 |
| 2020/0277080 A1 * | 9/2020 | Wiegman | B60L 58/16 |
| 2020/0290742 A1 * | 9/2020 | Kumar | B64D 27/02 |
| 2020/0312164 A1 * | 10/2020 | Bazawada | G01C 23/00 |
| 2020/0361602 A1 * | 11/2020 | Cao | B64C 29/0008 |

FOREIGN PATENT DOCUMENTS

| | | | | |
|---|---|---|---|---|
| KR | 20150090992 A | * | 8/2015 | ............... H04N 7/85 |
| WO | WO-2009005875 A2 | * | 1/2009 | ........... B64C 39/024 |
| WO | WO-2017063088 A1 | * | 4/2017 | ............. B64C 27/08 |

* cited by examiner

HOVER TIME REMAINING FOR AN AIRCRAFT

FIELD

The present subject matter relates generally to aircraft systems for rotor and tilt-rotor aircraft. More particularly, the present subject matter relates to aircraft systems relating to hover maneuvers performed by rotor and tilt-rotor aircraft.

BACKGROUND

During some flight missions, rotor and tilt-rotor aircraft perform hover maneuvers in severe operating environments, such as e.g., low altitude, low speed hovers over salt water or sandy environments. Performing hover maneuvers in such severe environments can lead to deterioration of engine life and performance.

In some instances, a hover maneuver is performed for a prolonged period in such environments. For example, saltwater search and rescue operations, sonar buoy dipping, and mine towing all may require prolonged low altitude, low speed hover maneuvers in a severe operating environment. During such missions, as the aircraft hovers over the water, saltwater spray ingestion causes gradual and sometimes rapid deterioration of engine performance. Conventionally, pilots have monitored the exhaust gas temperature (EGT) of the aircraft's engine(s) to estimate how long the aircraft can remain in the hover before engine performance has deteriorated past a certain threshold. When the EGT threshold is reached, the pilot typically aborts the hover maneuver to avoid potential engine damage or failure. Monitoring the EGT while performing a hover maneuver in a severe operating environment can present numerous challenges for the pilot and can distract the pilot from the mission at hand. Moreover, utilizing EGT can be an inaccurate way of measuring the actual performance and engine health deterioration.

Therefore, systems and methods for determining a hover time remaining for an aircraft performing a hover maneuver would be desirable.

BRIEF DESCRIPTION

Exemplary aspects of the present disclosure are directed to methods and systems for determining a hover time remaining for an aircraft performing a hover maneuver. Aspects and advantages of the invention will be set forth in part in the following description, or may be obvious from the description, or may be learned through practice of the invention.

In one exemplary aspect, the present disclosure is directed to a method for determining a hover time remaining for an aircraft configured to perform a hover maneuver. The aircraft includes a powerplant. The method includes obtaining, by one or more computing devices, one or more performance indicators indicative of the performance of the powerplant while the aircraft performs the hover maneuver. The method further includes determining, by the one or more computing devices, a power required and a power available for the aircraft to perform the hover maneuver based at least in part on the one or more performance indicators. Moreover, the method further includes determining, by the one or more computing devices, the hover time remaining based at least in part on the power required and the power available determined by the one or more computing devices.

In another exemplary aspect, the present disclosure is directed to a method for determining a hover time remaining for an aircraft configured to perform a hover maneuver. The aircraft includes one or more engines. The method includes obtaining, by one or more computing devices, one or more performance indicators indicative of the performance of the engine while the aircraft performs the hover maneuver. The method also includes determining, by the one or more computing devices, a power available and a power required for the aircraft to perform the hover maneuver over a predetermined operating period based at least in part on the one or more performance indicators. The method further includes determining, by the one or more computing devices, a power required function indicative of the power required as a function of time based at least in part on the power required over the predetermined operating period. Moreover, the method also includes determining, by the one or more computing devices, a power available function indicative of the power available as a function of time based at least in part on the power available over the predetermined operating period. In addition, the method includes determining, by the one or more computing devices, the hover time remaining based at least in part on an intersection of the power available function and the power required function.

In a further exemplary aspect, the present disclosure is directed to an aircraft system for an aircraft configured for performing a hover maneuver, the aircraft includes one or more engines. The aircraft system includes one or more aircraft sensors for sensing one or more performance indicators indicative of the performance of the one or more engines while the aircraft performs the hover maneuver. The aircraft system also includes an aircraft computing system comprising one or more computing devices, the one or more computing devices comprising one or more processors and one or more memory devices, the one or more memory devices storing instructions that when executed by the one or more processors cause the one or more processors to perform operations, the one or more computing devices configured to: obtain the one or more performance indicators; determine a power required and a power available for the aircraft to perform the hover maneuver; prognosticate the power required as a function of time to determine a power required function; prognosticate the power available as a function of time to determine a power available function; and determine the hover time remaining based at least in part on an intersection of the power available function and the power required function.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
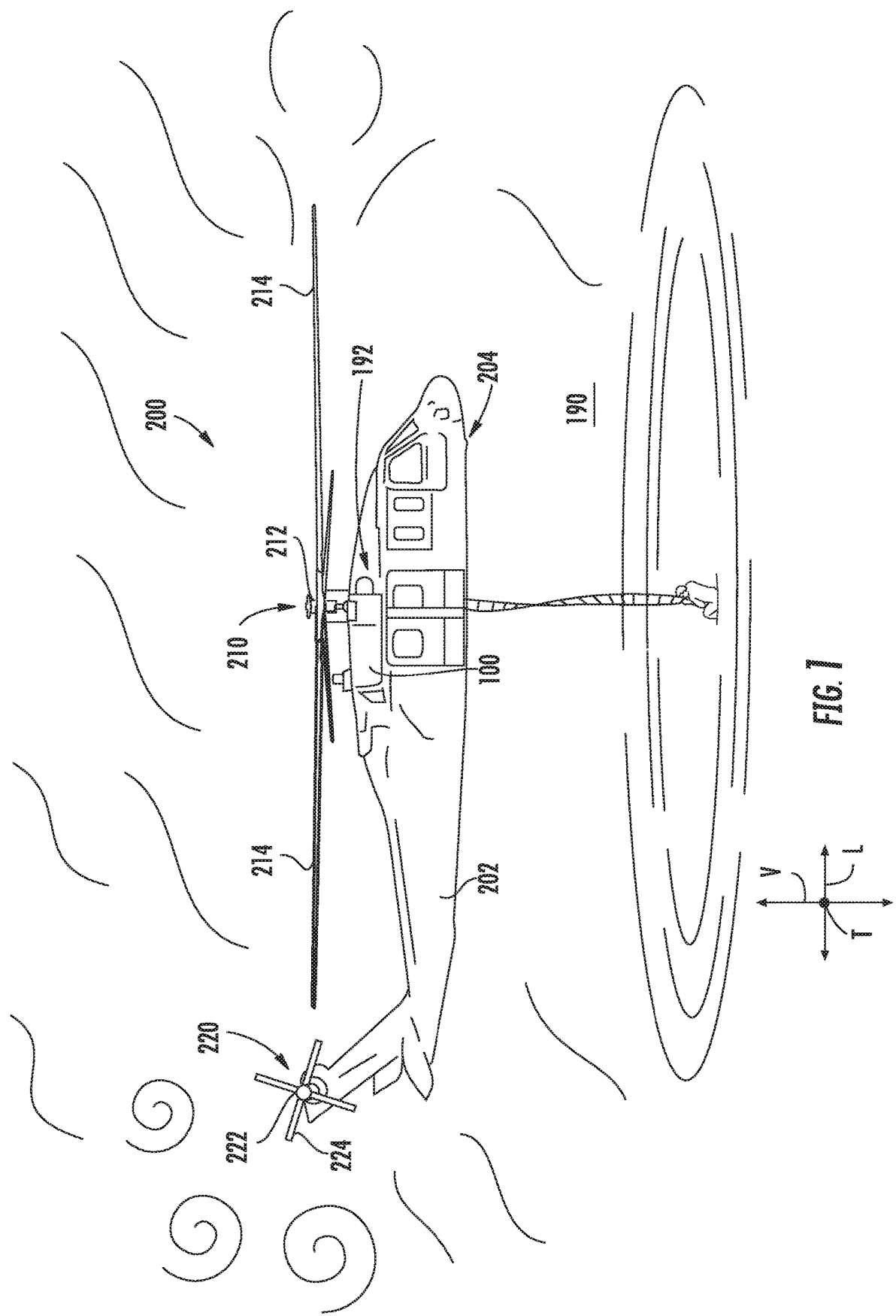
FIG. 1 provides a schematic view of an aircraft performing a hover maneuver according to an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

Generally, a hover maneuver is a maneuver in which an aircraft is maintained in nearly motionless flight over a reference point at a constant altitude and on a constant heading. For the purposes of the present disclosure, hover maneuvers also include hovering turns, forward hovering flight, sideward hovering flight, rearward hovering flight, hover taxi, air taxi, and surface taxi maneuvers, as well as other like or similar hovering maneuvers.

Exemplary aspects of the present disclosure are directed to systems and methods that include features for determining a hover time remaining for an aircraft performing a hover maneuver. In some exemplary embodiments, the hover time remaining can be communicated to the pilot or one or more aircrew members. Communicating the hover time remaining in terms of a "time remaining" provides a pilot with a real time, useable measure that allows the pilot to focus on the mission instead of being distracted by monitoring the EGT of the aircraft's powerplant or some other performance indicator. In addition, the exemplary systems and methods disclosed herein include features for accurately measuring the actual rate of powerplant deterioration and performance while the aircraft performs a hover maneuver. These and other features, aspects, and advantages of the present subject matter will be appreciated with reference to the following description and appended claims.

Referring now to the drawings, FIG. 1 provides a schematic view of an exemplary aircraft 200 performing a hover maneuver according to an exemplary embodiment of the present disclosure. As shown in FIG. 1, the aircraft 200 defines a transverse direction T, a longitudinal direction L, and a vertical direction V. In operation, the aircraft 200 may move along or around the transverse direction T, the longitudinal direction L, and/or the vertical direction V. In the embodiment illustrated in FIG. 1, the aircraft 200 includes an airframe 202 defining a cockpit 204. The cockpit 204 includes a number of flight controls to control the aircraft 200 during flight and to perform certain aerial maneuvers, such as a hover maneuver. In particular, a pilot can manipulate or adjust a collective control, a cyclic control, a tail rotor control, a first throttle control, and a second throttle control to perform a hover maneuver or otherwise control the aircraft 200 during operation. The aircraft 200 further includes a main rotor assembly 210 and a tail rotor assembly 220. The main rotor assembly 210 includes a main rotor hub 212 and a plurality of main rotor blades 214. As shown, each main rotor blade 214 extends outwardly from the main rotor hub 212. The tail rotor assembly 220 includes a tail rotor hub 222 and a plurality of tail rotor blades 224. Each tail rotor blade 224 extends outwardly from the tail rotor hub 222.

Referring still to FIG. 1, as shown, the aircraft 200 includes a powerplant. Specifically, for this embodiment, the aircraft 200 includes first and second gas turbine engines 100 (only one shown in FIG. 1) that may be mechanically coupled to one another such that the first and second gas turbine engines 100 operate together. For example, the gas turbine engines 100 may be ganged together in a gearbox by, e.g., differentials and one-way clutches (such as sprag clutches), such that they operate together. Further, the gas turbine engines 100 may generally generate and transmit power to drive rotation of the main rotor blades 214 and the tail rotor blades 224. In particular, rotation of the main rotor blades 214 generates lift for the aircraft 200, while rotation of the tail rotor blades 224 generates sideward thrust to counteract the torque exerted on the airframe 202 by the main rotor blades 214.

The collective control adjusts a pitch angle of the main rotor blades 214 collectively (i.e., all at the same time) to increase or decrease an amount of lift the aircraft 200 derives from the main rotor blades 214 at a given rotor speed. Accordingly, manipulating the collective control may cause the aircraft 200 to move in one of two opposing directions along the vertical direction V. To maintain altitude during a hover maneuver, the pilot may manipulate collective control.

Referring still to FIG. 1, the cyclic control controls movement of the aircraft 200 along the longitudinal direction L and about the transverse direction T. In particular, the cyclic control adjusts an angle of the aircraft 200 allowing the aircraft 200 to move forward or backwards along the longitudinal direction L or sideways in the transverse direction T. Additionally, the tail rotor control controls a pitch angle of the tail rotor blades 224. In operation, manipulating the tail rotor control may cause the tail rotor assembly 220 to move along the transverse direction T and thereby change the orientation or heading of the aircraft 200.

The first and second throttle controls may be moved to an on position at the start of a flight and actuated during the flight to provide a desired amount of power for the aircraft 200. In some embodiments, these controls may be manually actuated or alternatively may be actuated by one or more engine controllers (described below), e.g., in response to and input from the collective control.

Although the aircraft 200 is shown and described herein as having a main/tail rotor configuration, it will be appreciated that the teachings of the present disclosure can apply to other types of aircrafts and aircraft configurations as well. For example, the aircraft 200 can be any aircraft, vehicle, or device capable of performing a hover maneuver, including but not limited to coaxial rotor helicopters, tandem rotor helicopters, side-by-side rotor helicopters, twin intermeshing rotor helicopters, tilt-rotor aircrafts, Unmanned Aircraft System (UAS) with an aerial vehicle having hover capability, or fixed-wing aircraft with vertical takeoff and landing (VTOL) capability or hover capability.

As shown further in FIG. 1, the aircraft 200 is performing a hover maneuver in a severe operating environment 190. More particularly, for this embodiment, the aircraft 200 is performing a hover maneuver over salt water for an oceanic search and rescue mission. Although the severe operating environment 190 is shown in FIG. 1 as the airspace over salt water, it will be appreciated that severe operating environment 190 can be other types of environments in which engine performance may deteriorate relatively rapidly, such as e.g., the airspace over a desert environment, a forest fire environment, and/or an airspace that includes volcanic ash.

While performing a hover maneuver in the severe operating environment 190, the powerplant (e.g., one or more gas turbine engines 100) of the aircraft 200 can deteriorate due to ingestion of harmful foreign object debris and/or other particles within the air. In some severe operating environments 190, the engine 100 can experience rapid deterioration. For instance, in FIG. 1, the engines 100 are shown ingesting saltwater spray, denoted by 192. Even over a relatively short period of time, such as e.g., thirty (30) minutes, the saltwater spray can form a coat on the turbomachinery components and other surfaces of the engines 100, leading to rapid deterioration of engine performance and potentially catastrophic damage to the engines 100. The rate of deterioration can vary greatly based on the operating conditions in which the aircraft 200 is performing the hover. For example, in airspace over an oceanic environment, the sea and wind conditions can affect the rate of deterioration of the engine 100. Moreover, the vertical distance the aircraft 200 is hovering over the water (i.e., the Above Ground Level (AGL)) also affects the rate of deterioration of the aircraft 200. For example, an aircraft performing an In Ground Effect (IGE) hover maneuver in a severe operating environment 190 may deteriorate faster than an aircraft performing an Out of Ground Effect (OGE) hover maneuver in the same severe operating environment or vice versa.

As engine performance of one or more of the engines 100 of the aircraft 200 deteriorate over the course of the hover maneuver, to maintain the hover, the engines 100 must compensate for the degradation in engine performance. For example, the engine 100 can compensate by applying more fuel. At some point in time, the engine performance deteriorates beyond the engine or engines' capabilities to maintain the hover maneuver, as the power available from the engine or engines is less than the power required by the aircraft. In some cases, if the hover maneuver is not aborted, one or more engines can be lost, and/or the aircraft may experience loss of control, potentially compromising the mission.

As will be explained herein, the present subject matter provides features for communicating a hover time remaining to the pilot, or more broadly, to aircrew members. In this way, the present subject matter provides a "short term deterioration timer" which may alert a pilot or aircrew members as to the remaining time in which the aircraft 200 can safely perform or continue performing the hover maneuver. Additionally or alternatively, the hover time remaining can be used to adjust the flight plan or mission of the aircraft 200.

Figure 2:
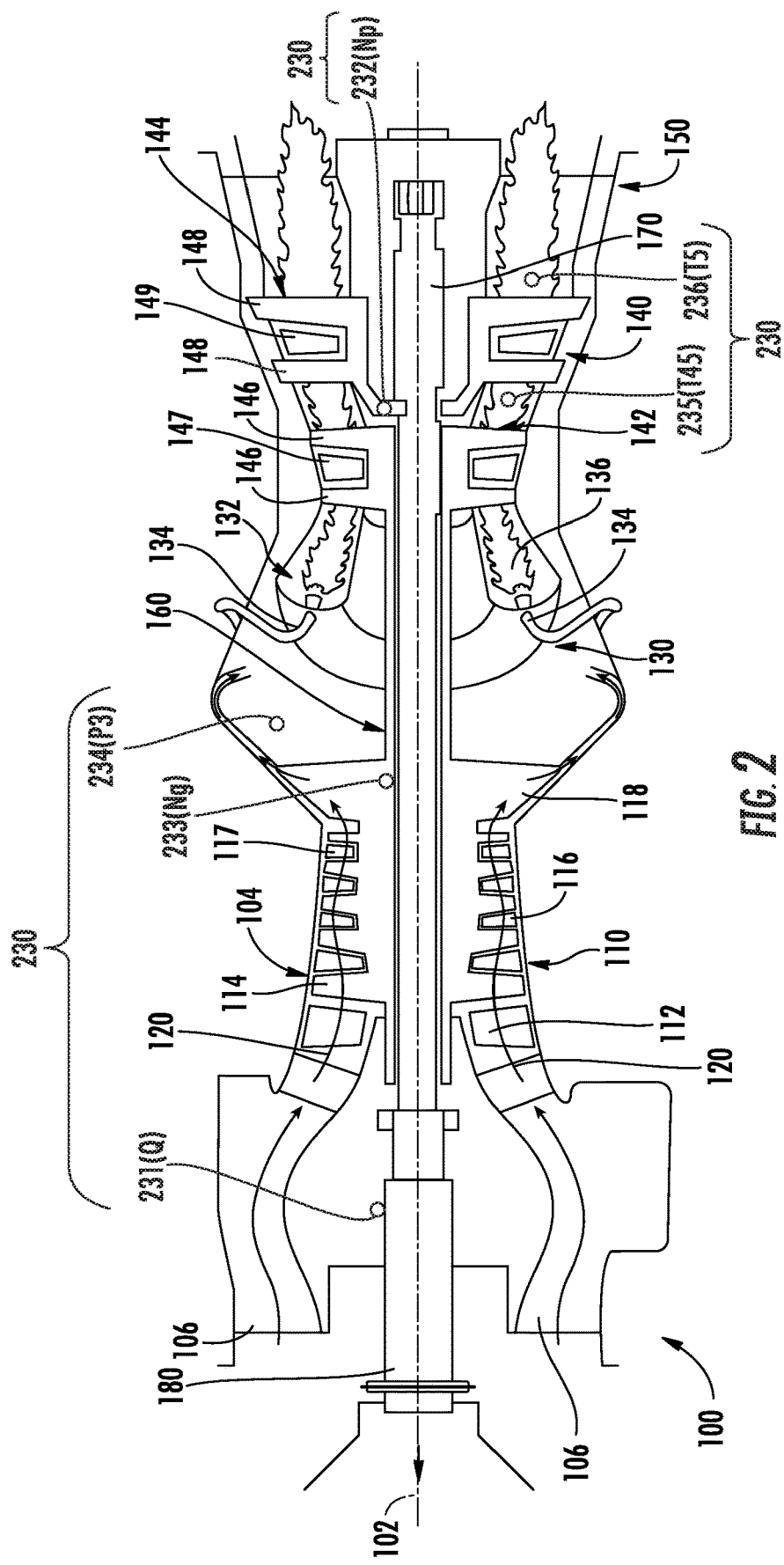
FIG. 2 provides a schematic cross-sectional view of an exemplary gas turbine engine of the aircraft of FIG. 1 according to an exemplary embodiment of the present disclosure.

FIG. 2 provides a schematic cross-sectional view of an exemplary gas turbine engine 100 of the aircraft 200 of FIG. 1 according to an exemplary embodiment of the present disclosure. The gas turbine engine 100 defines a longitudinal or centerline axis 102. The gas turbine engine 100 may generally include a substantially tubular outer casing 104 that defines an annular inlet 106. The outer casing 104 may be formed from a single casing or multiple casings. The outer casing 104 encloses, in serial flow relationship, a gas generator compressor 110, a combustion section 130, a turbine 140, and an exhaust section 150. The gas generator compressor 110 includes an annular array of inlet guide vanes 112, one or more sequential arrays of compressor blades 114, one or more sequential arrays of variable stator vanes 116, one or more sequential arrays of stationary compressor vanes 117, and a centrifugal compressor 118. Collectively, the compressor blades 114, variable stator vanes 116, stationary compressor vanes 117, and the centrifugal compressor 118 define a compressed air path 120.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gases 136 drive both the compressor 110 and the turbine 140.

The turbine 140 includes a gas generator turbine 142 and a power turbine 144. The gas generator turbine 142 includes one or more sequential arrays of turbine rotor blades 146 and one or more sequential arrays of stator vanes 147. Likewise, the power turbine 144 includes one or more sequential arrays of turbine rotor blades 148 and one or more sequential arrays of stator vanes 149. As will be discussed below in more detail, the gas generator turbine 142 drives the gas generator compressor 110 via a gas generator shaft 160, and the power turbine 144 drives an output shaft 180 via a power shaft 170.

As shown in the embodiment illustrated in FIG. 2, the gas generator compressor 110 and the gas generator turbine 142 are coupled to one another via the gas generator shaft 160. In operation, the combustion gases 136 drive both the gas generator turbine 142 and the power turbine 144. As the gas generator turbine 142 rotates around the centerline axis 102, the gas generator compressor 110 and the gas generator shaft 160 both rotate around the centerline axis 102. Further, as the power turbine 144 rotates, the power shaft 170 rotates and transfers rotational energy to the output shaft 180.

Although one or more gas turbine engines configured in a turboshaft configuration are shown and described herein as the powerplant for exemplary aircraft 200, it will be appreciated that the teachings of the present disclosure can apply to other types of powerplants. For example, the powerplant can include one or more gas turbine engines having a different configuration, such as e.g., a turboprop or turbofan gas turbine engine. As another example, the powerplant can be a piston-driven combustion engine, a hybrid electric propulsion system, or an electric propulsion system. Other suitable powerplants are contemplated.

As further shown in FIG. 2, the gas turbine engine 100 can include one or more aircraft sensors 230 positioned within or along the gas turbine engine 100. As shown, for this embodiment, the gas turbine engine 100 includes an engine torque sensor 231 positioned proximate the output shaft 180 for measuring engine torque (Q). It will be appreciated that the engine torque sensor 231 can be positioned in other suitable locations as well, such as proximate the gas generator shaft 160 or the power shaft 170. Moreover, the engine torque sensor 231 can include a network of sensing devices positioned along the gas turbine engine 100. The gas turbine engine 100 also includes a power shaft speed sensor 232 positioned proximate the power shaft 170 for sensing the power shaft speed (Np). As further shown, the gas turbine engine 100 also includes a gas generator shaft speed sensor 233 positioned proximate the gas generator shaft 160 for sensing the gas generator shaft speed (Ng). In addition, the gas turbine engine 100 further includes a pressure sensor 234 positioned in the combustion section 130 for sensing the pressure of the air exiting the compressor, or the compressor discharge pressure (P3). The gas turbine engine 100 also includes one or more temperature sensors, and for this embodiment, the gas turbine engine 100 includes a power turbine inlet temperature sensor 235 for sensing the power turbine inlet temperature (T45) and a power turbine outlet temperature sensor 236 for sensing the power turbine outlet temperature (T5). The aircraft sensors 230 can be used, for example, to measure or sense one or more performance indicators of the engines 100. It will be appreciated that the aircraft 200 can include other suitable sensors for measuring or sensing one or more performance indicators as well.

Figure 3:
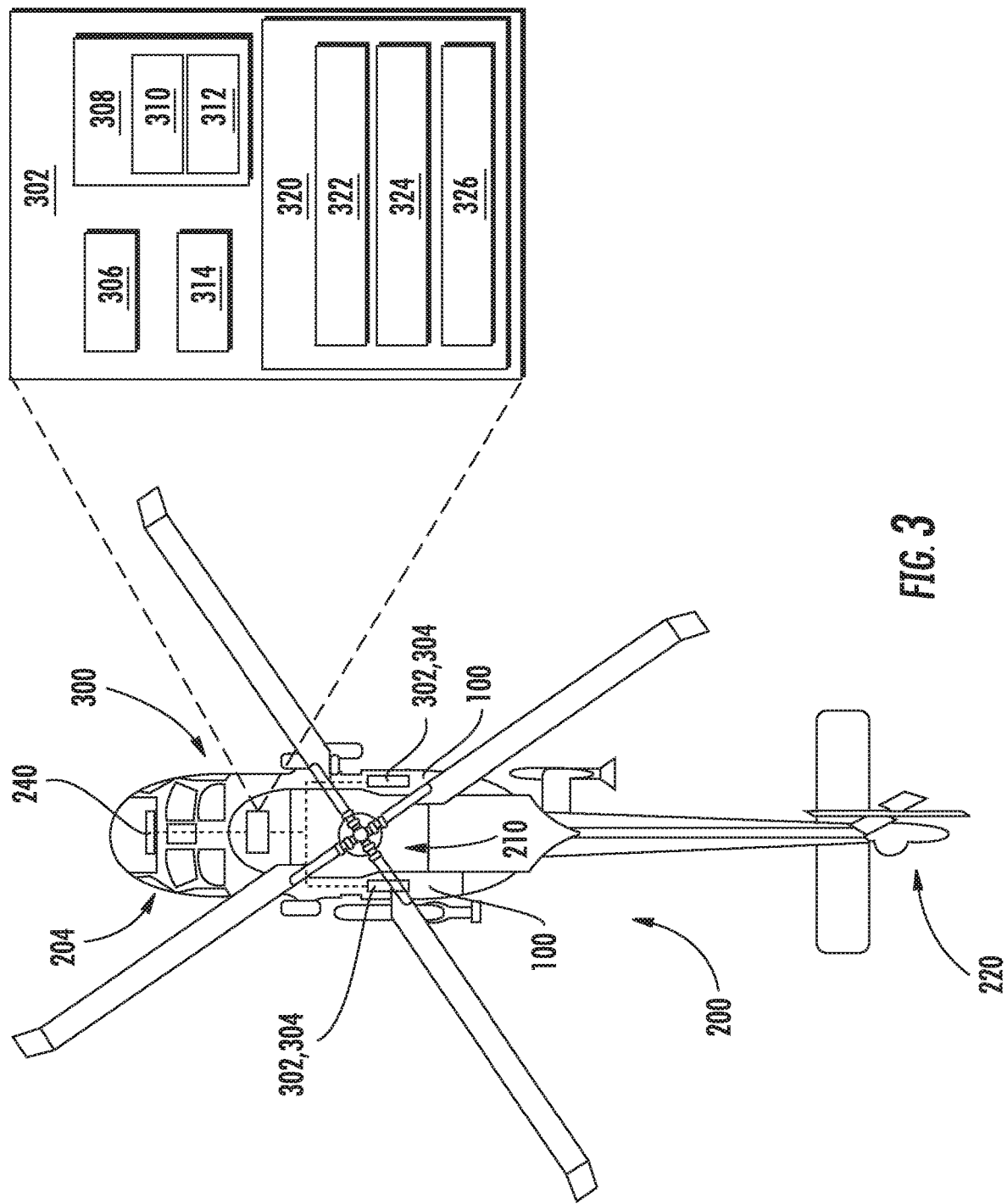
FIG. 3 provides a schematic view of an exemplary aircraft computing system of the aircraft of FIG. 1 according to an exemplary embodiment of the present disclosure.

FIG. 3 provides a schematic view of an exemplary aircraft computing system 300 according to an exemplary embodiment of the present disclosure. The aircraft computing system 300 can be utilized by or for any suitable aircraft, such as the aircraft 200 of FIG. 1. Aircraft computing system 300 can be located exclusively onboard the aircraft 200 or partially off board and partially onboard the aircraft 200.

As shown in FIG. 3, the aircraft computing system 300 of exemplary aircraft 200 includes various computing devices 302. In particular, for this embodiment, the computing devices 302 of the aircraft computing system 300 include one or more engine controller(s) 304 configured to control their respective engines 100, as well as other computing devices, such as e.g., a mission computer, a flight management computer, etc. For this embodiment, the aircraft 200 includes two engines 100 mounted to or integral with the airframe 202 of the aircraft 200. Each engine 100 is controlled by its respective engine controller 304. Each engine controller 304 can be, for example, an Electronic Engine Controller (EEC) or a Digital Engine Controller (DEC) of a Full Authority Digital Engine Control (FADEC) system.

One or more of the computing device(s) 302 of the aircraft computing system 300, including the engine controllers 304, can include one or more processor(s) 306 and one or more memory device(s) 308. The one or more processor(s) 306 can include any suitable processing device, such as a microprocessor, microcontroller, integrated circuit, logic device, and/or other suitable processing device. The one or more memory device(s) 308 can include one or more computer-readable media, including, but not limited to, non-transitory computer-readable media, RAM, ROM, hard drives, flash drives, and/or other memory devices.

The one or more memory device(s) 308 can store information accessible by the one or more processor(s) 306, including computer-readable instructions 310 that can be executed by the one or more processor(s) 306. The instructions 310 can be any set of instructions that when executed by the one or more processor(s) 306, cause the one or more processor(s) 306 to perform operations. In some embodiments, the instructions 310 can be executed by the one or more processor(s) 306 to cause the one or more processor(s) 306 to perform operations, such as any of the operations and functions for which the computing devices 302 are configured, such as the operations for determining the hover time remaining of an aircraft performing a hover maneuver (e.g., methods (500), (600)), as described herein. The instructions 310 can be software written in any suitable programming language or can be implemented in hardware. Additionally, and/or alternatively, the instructions 310 can be executed in logically and/or virtually separate threads on processor(s) 306.

The memory device(s) 308 can further store data 312 that can be accessed by the one or more processor(s) 306. For example, the data 312 can include models, formulas, flight history, lifing models, deterioration models, etc. that can be used to calculate engine performance and trend engine performance over time. The data 312 can also include other data sets, parameters, outputs, information, etc. shown and/or described herein.

The computing device(s) 302 can also include a communication interface 314 used to communicate, for example, with the other components of the aircraft 200. The communication interface 314 can include any suitable components for interfacing with one or more network(s) or electronic components, including for example, transmitters, receivers, ports, controllers, antennas, and/or other suitable components. Communication interface 314 can be used to communicate with other electronic devices over one or more networks, such as e.g., a local area network (LAN), a wide area network (WAN), SATCOM network, VHF network, a HF network, a Wi-Fi network, a WiMAX network, a gate-link network, and/or any other suitable communications network for transmitting messages to and/or from the aircraft 200 or within the aircraft 200, such as from one engine controller 304 to the other or to another computing device 302. Communication interface 314 can communicate over one or more networks using a wide variety of communication protocols. The communication interface 314 can include a data bus or a combination of wired and/or wireless communication links that communicatively couple the computing device 302 with other electronic devices.

As further shown in FIG. 3, at least one of the computing devices 302 of the aircraft computing system 300 includes a hover time model 320 for outputting a hover time remaining for the aircraft 200 performing a hover maneuver. As shown, Hover time model 320 includes an engine performance model 322, a prognostic health monitoring model 324, denoted herein by PHM model 324, and a machine-learned model 326.

The engine performance model 322, as will be described in more detail below, receives or otherwise obtains one or more engine performance indicators. The performance indicators can be measured, sensed, or calculated values that are collected by the one or more aircraft sensors 230 or other data collection devices positioned on or along the engines 100 or aircraft 200. In some embodiments, for example, data indicative of the flight conditions can be input into the engine performance model 322 to assist the model with determining the engine performance of the engines 100. The engine performance model 322 obtains the performance indicators, and then determines or calculates one or more values indicative of engine performance, such as the power available and the power required for the aircraft 200 to perform a desired maneuver, such as e.g., a hover maneuver. The power available and power required can be output in any suitable power units, such as, e.g., horse power (hp).

The PHM model 324 is a model configured to prognosticate or predict the engine health and/or performance over a period of time based at least in part on current or present engine performance data, as will likewise be explained more fully below. For this embodiment, the PHM model 324 is configured to utilize the engine performance data output by the engine performance model 322 to prognosticate or trend the engine performance as a function of time into the future. In this way, the engine performance model 322 and the PHM model 324 work in conjunction to output the hover time remaining for the aircraft 200 to perform the hover maneuver. As further shown in FIG. 3, the machine-learned model 326 of the hover time model 320 can be used in conjunction with the PHM model 324 to determine the hover time remaining as will be further explained herein.

Figure 4:
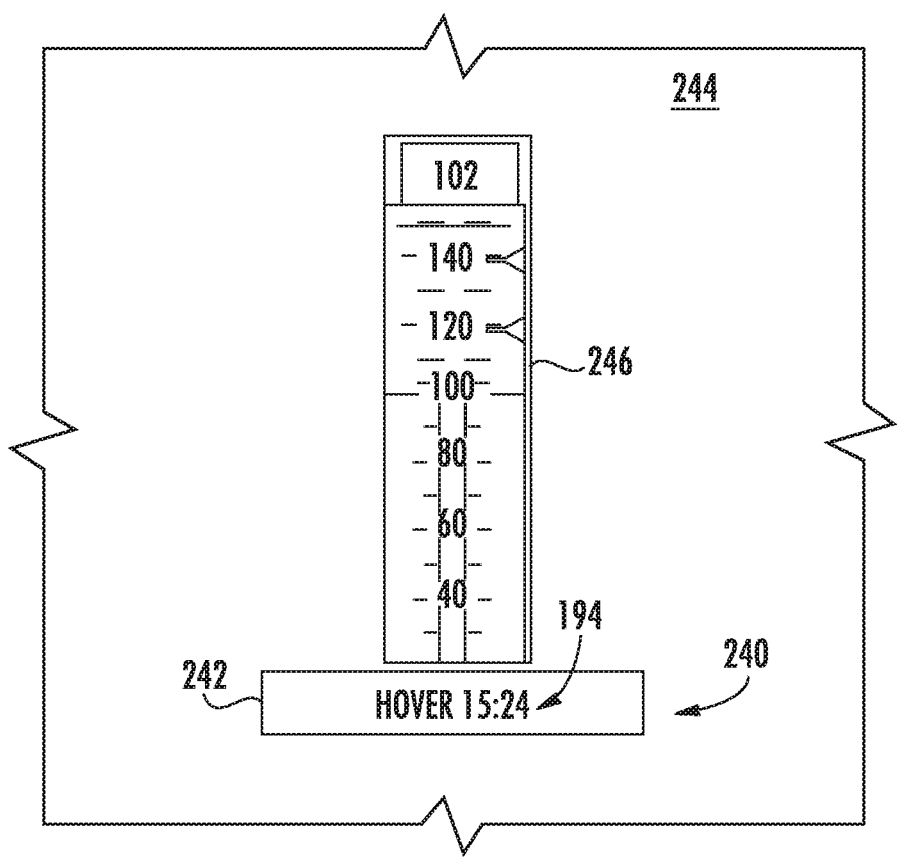
FIG. 4 provides an exemplary communication device for communicating a hover time remaining for an exemplary aircraft performing a hover maneuver.

Referring now to FIGS. 3 and 4, FIG. 4 provides an exemplary communication device 240 for communicating a hover time remaining 194 for an exemplary aircraft 200 performing a hover maneuver. As shown, the communication device 240 is configured to communicate the output of the hover time model 320 (i.e., the hover time remaining 194). For this embodiment, the communication device 240 is positioned within the cockpit 204 and is included on an instrument panel 244 next to a power pod indicator 246. As shown, the communication device 240 is a timer instrument 242 and is configured to digitally display the hover time remaining 194. Additionally or alternatively, in some embodiments, the communication device 240 can include one or more speakers positioned within the cockpit 204. In this way, at certain intervals, upon reaching a predetermined time remaining, or upon a pilot request the one or more speakers can be configured to audibly communicate the hover time remaining 194 to the pilot or other aircrew members. In instances where the pilot is operating the aircraft 200 from within the cockpit 204, the communication interface 204 can include one or more headsets or helmets worn by the pilots and crew members that are communicatively coupled with the aircraft computing system 300. It will be appreciated that communication device 240 can be any suitable type of device and can be positioned in any suitable location, including within the aircraft 200, worn by one or more aircrew members (e.g., the pilot or copilot), or in some embodiments, the communication device 240 can be positioned proximate a remote pilot station that is part of an unmanned aircraft system (UAS).

Figure 5:
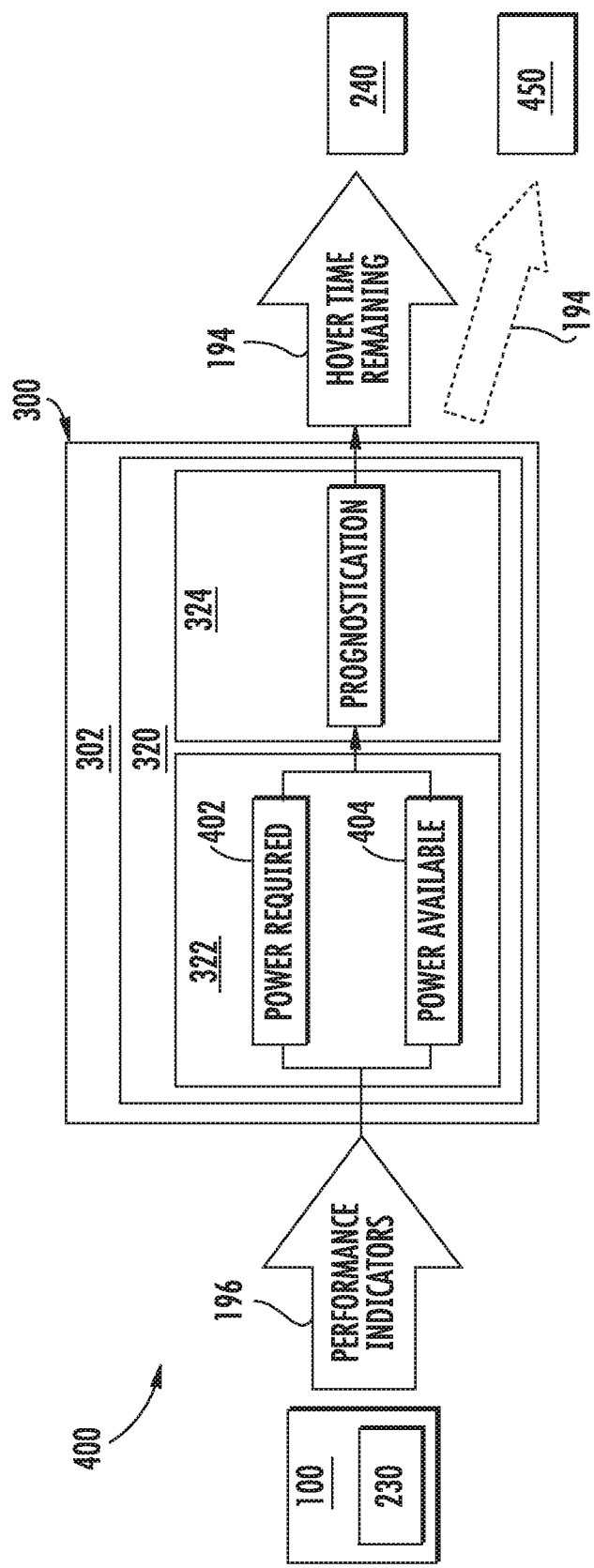
FIG. 5 provides a flow diagram for determining a hover time remaining according to an exemplary embodiment of the present disclosure.
Figure 6:
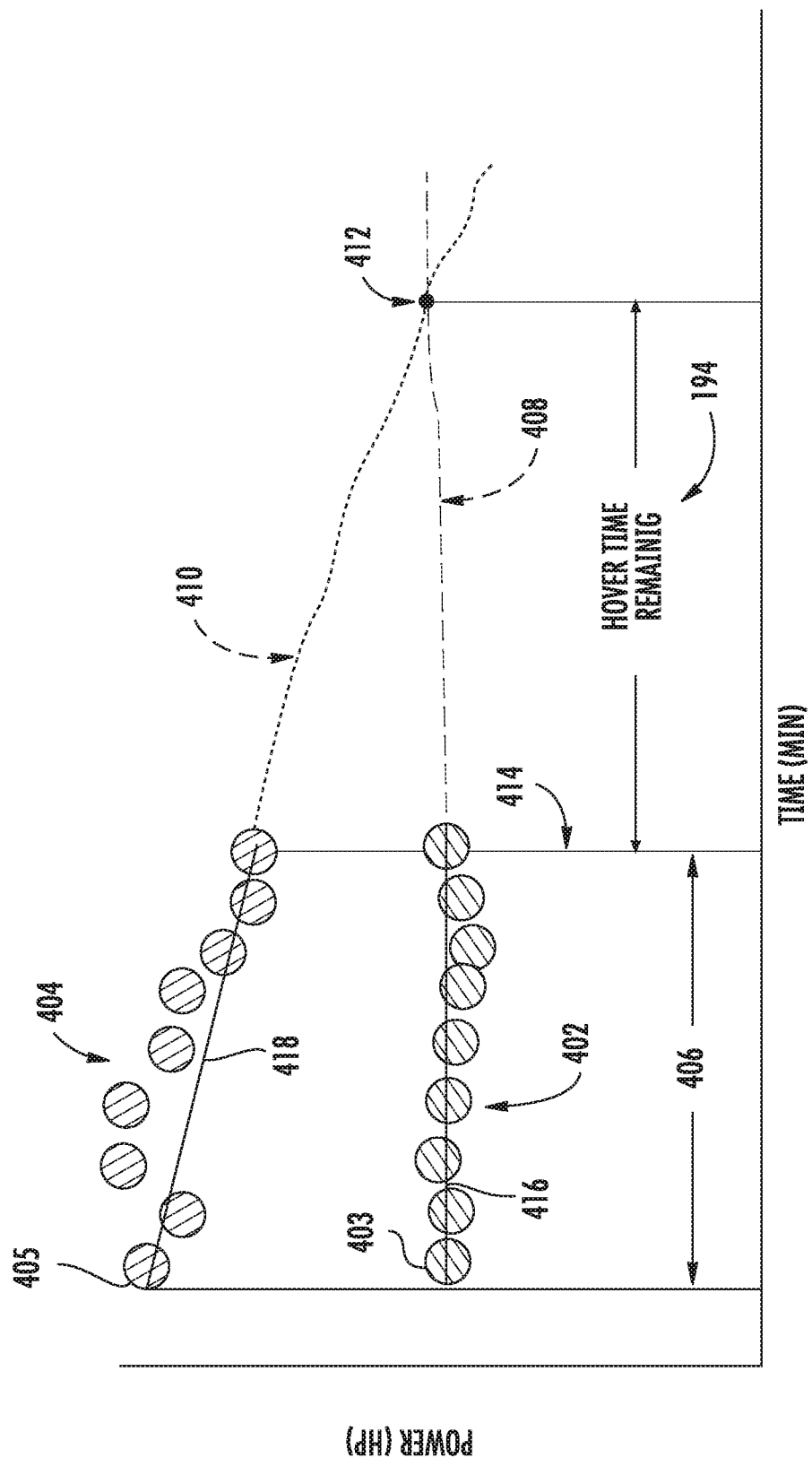
FIG. 6 provides a plot of an exemplary aircraft's power available and power required while performing a hover maneuver as a function of time according to an exemplary embodiment of the present disclosure.

Referring now to FIGS. 5 and 6, FIG. 5 provides a flow diagram for determining the hover time remaining 194 according to an exemplary embodiment of the present disclosure and FIG. 6 provides a plot of the power available and power required for the exemplary aircraft 200 while performing a hover maneuver as a function of time according to an exemplary embodiment of the present disclosure. During a mission, as will be appreciated, a rotor, tilt-rotor, or otherwise hover capable aircraft can perform a hover maneuver. In some instances, the aircraft can perform the hover maneuver in a severe operating environment. In such cases, it may be desirable to indicate the hover time remaining 194 to the pilot or other aircrew members. To indicate that a hover maneuver is being performed in a severe operating environment, the pilot can indicate that the aircraft is performing such a hover maneuver in the severe operating conditions, or a regime-recognition system of the aircraft can automatically recognize that such a maneuver is being performed and can activate or initiate determining the hover time remaining.

After it is determined that the aircraft 200 is performing a hover maneuver in a severe operating environment, one or more aircraft sensors 230 positioned within each of the engines 100 sense, measure, and/or otherwise collect one or more performance indicators 196 of the engines 100 as shown in FIG. 5. A performance indicator 196 is any sensed or measured value or signal that can affect or be used to calculate engine power (i.e., performance). Exemplary performance indicators 196 can include engine torque (Q), power shaft speed (Np), gas generator shaft speed (Ng), compressor discharge pressure (P3), power turbine inlet temperature (T45), and/or power turbine outlet temperature (T5). It will be appreciated that other performance indicators 196 are also possible.

As further shown in FIG. 5, one or more signals indicative of the performance indicators 196 are routed from their respective aircraft sensors 230 to the aircraft computing system 300 by one or more communication lines or busses. In particular, the performance indicators 196 are routed to one or more of the computing devices 302 of the aircraft computing system 300. More specifically, the hover time model 320 receives or otherwise obtains the performance indicators 196.

Upon obtaining the performance indicators 196, the engine performance model 322 of the hover time model 320 then calculates or otherwise determines the power required 402 and the power available 404 for the aircraft 200. In particular, the power required 402 and the power available 404 are each determined over a predetermined operating 406. The predetermined operating period 406 can be any suitable length of time. In some embodiments, for example, the predetermined operating period can be thirty (30) seconds. As another example, in some embodiments, the predetermined operating period can be five (5) seconds. As yet another example, in some embodiments, the predetermined operating period can be three (3) minutes. As yet another example, in some embodiments, the predetermined operating period can be five (5) minutes.

After determining the power required 402 and the power available 404 over the predetermined operating period 406, data points for the power required 402 and the power available 404 can be plotted over time as shown in FIG. 6. To determine the power required 402 and power available 404 over the predetermined operating period 406, it will be appreciated that performance indicators 196 can be continuously routed to the hover time model 320, and in particular the engine performance model 322, such that data points can be plotted over the predetermined operating period 406.

In FIG. 6, the power required 402 is shown remaining relatively stable as the severe operating environment in which the aircraft 200 is operating, while severe, typically does not change significantly while the aircraft 200 performs the hover maneuver, as is the case for this embodiment. Thus, the required power 402 to perform the hover is relatively constant for this embodiment as shown in FIG. 6. On the other hand, for this embodiment, the power available 404 is not constant as it deteriorates over time due to the effects of the severe operating environment as shown in FIG. 6. For instance, spray ingestion into the engines 100 of the aircraft 200 while hovering over saltwater or sand ingestion while hovering over a desert environment can rapidly deteriorate engine performance.

The power required 402 is the amount of power, typically rated in horsepower (hp), required for an aircraft to perform a particular maneuver, such as a hover maneuver. Performance indicators 196 that can be used to calculate or otherwise determine the power required include torque (Q), power shaft speed (Np), as well as other indicators, for example. Many parameters can affect the hover time remaining for an aircraft performing a hover maneuver. For example, suppose an aircraft is performing a hover maneuver in the airspace over saltwater and that there is a significant crosswind. To maintain the aircraft over a reference point at a constant altitude and on a constant heading, the powerplant of the aircraft will require more power to maintain the position of aircraft than if there was not a significant crosswind. In this way, various parameters that affect the hover time remaining of the aircraft performing the hover maneuver, such as e.g., operating conditions, weather, etc., are reflected in the power required.

The power available 404 is the amount of power, also typically rated in horsepower (hp), that is available to perform a particular maneuver. Performance indicators 196 that can be used to calculate or otherwise determine the power available 404 include engine torque (Q), power shaft speed (Np), gas generator shaft speed (Ng), compressor discharge pressure (P3), power turbine inlet temperature (T45), power turbine outlet temperature (T5), fuel flows, etc. As noted above, many parameters can affect the hover time remaining for an aircraft performing a hover maneuver. For example, continuing with the example above where the aircraft is performing a hover maneuver in the airspace over saltwater, suppose the crosswind increases the amount and rate of ingestion of salt water into the powerplant. While these parameters affect the hover time remaining of the aircraft, they are reflected in the power available. That is, the amount and rate of ingestion of saltwater into the powerplant is reflected in the rate of change of the power available over time. In this way, various parameters that affect the hover time remaining of the aircraft performing the hover maneuver, such as e.g., operating conditions, weather, etc., are reflected in the power available. Indeed, parameters that affect the hover time remaining are reflected in either the power required, the power available, or both.

The power available 404 can be limited by a number of limiting factors. For instance, if a gas turbine engine exceeds its turbine temperature limit, the engine can become damaged. In this regard, the power turbine inlet temperature (T45) or power turbine outlet temperature (T5) can be used to determine the temperature along the hot gas path of the power turbine 144 to ensure the turbine temperature limit is not exceeded. The power available of a turbine engine may also be limited by engine speed. In this regard, the power shaft speed (Np) and/or gas generator shaft speed (Ng) can be used to determine the engine speed so that the engine speed limitation is not exceeded. Further, the power available of an engine can be limited by a torque limit. If the torque limit is exceeded, various components of the aircraft 200 can be damaged, such as a gearbox connecting the engine to the main rotor 210. In effect, one of the above limiting factors will set the ceiling for the power available 404 of the engines 100, as one of the limits will normally be exceeded before the others. In this way, when the data points of the power available 404 are plotted over the predetermined operating period 406, the limiting factor of the various performance indicators can be used as the data point for the power available 404 for that particular point in time.

After the power required 402 and the power available 404 are determined over the predetermined operating period 406, as shown in FIG. 5, the PHM model 324 obtains the performance data. As shown in FIG. 6, after obtaining the performance data (i.e., the power required 402 and the power available 404 over the predetermined operating period 406), the PHM model 324 prognosticates the data as a function of time. In particular, the PHM model 324 prognosticates (i.e., trends) the power required 402 as a function of time to determine a power required function 408. The PHM model 324 also prognosticates the power available 404 as a function of time to determine a power available function 410. Once the PHM model 324 determines the power required function 408 and the power available function 410 based on prognosticating the power required 402 and power available 404 over time, the hover time remaining 194 is determined based at least in part on an intersection 412 of the power required function 408 and the power available function 410 at a point in time. The time period from the current time 414 to the intersection 412 where the power required function 408 and the power available function 410 intersect is deemed the hover time remaining 194.

In some embodiments, in prognosticating the power required 402 and the power available 404 to determine the power required function 408 and the power available function 410, respectively, the PHM model 324 of the hover time model 320 determines a best fit line over the power required 402 and power available 404 data points plotted over the predetermined operating period 406. In particular, the PHM model 324, or more broadly, the hover time model 320 can determine a best fit line 416 for the power required 402 and a best fit line 418 for the power available 404. Based at least in part on these best fit lines 416, 418, the PHM model 324 can prognosticate the power required 402 and power available 404 as functions of time to ultimate determine their respective functions 408, 410. In some embodiments, the best fit lines 416, 418 need not be extend over all of the data points plotted within the predetermined operating period 406. For example, the best fit lines can extend over a certain portion of the data points, such as e.g., the most current twenty-five percent (25%) of the data points for the power required 402 and power available 404.

In some embodiments, the power required function 408 is determined at least in part by determining the rate of change of the power required 402 over at least a portion of the power available 402 data points determined over the operating period 406. In some embodiments, the power required function 408 is determined at least in part by determining the rate of change of the power required 402 over the power required 402 data points determined for the entire predetermined operating period 406.

In some embodiments, the power available function 410 is determined at least in part by determining the rate of change or deterioration of the power available 404 over at least a portion of the power available 404 data points determined over the operating period 406. In some embodiments, the power available function 410 is determined at least in part by determining the rate of change of the power available 404 over the power available 404 data points determined for the entire predetermined operating period 406.

In yet some further embodiments, the PHM model 324 is based at least in part on a long-term (i.e., lifing) engine health model. For such embodiments, the PHM model 324 is tailored for short-term deterioration analysis such that the PHM model 324 can prognosticate the power required function 408 and the power available function 410 over time based at least in part on the identified trends of the power required 402 and the power available 404 determined over the operating period 406. The PHM model 324 can also prognosticate or trend the functions 408, 410 based at least in part on the logic of the long-term model that is tailored for short-term applications, such as e.g., determining the hover time remaining of an aircraft performing a hover maneuver. For example, based on a particular identified trend or rate of change of the power required 402 and/or power available 404 over the predetermined operating period 406, the PHM model 324, which is based at least in part on one or more long-term engine health models, can either steadily decrease the rate of change of the power available function over time or steadily increase the rate of change of the power required based on past flight history for the particular engine, engine model, or like or similar engine models. In this way, the power required function 408 and the power available function 410 can be more accurately trended over time, thereby providing a pilot or the aircrew members with a more accurate hover time remaining.

In yet other embodiments, one or more computing devices 302 can include a machine-learned model 326 (FIG. 3) that can be used to determine or adjust the power required function 408 and/or the power available function 410 during prognostication of the power required 402 and the power available 404. In such embodiments, for example, the machine-learned model 326 can operate in conjunction with the PHM model 324 to adjust the power required function 408 and/or the power available function 410 based at least in part on flight history of the aircraft 200. In particular, the flight history can include data indicative of an actual rate of deterioration of the engines 100 of the aircraft 200 under severe operating conditions. Thus, the machine-learned model 326 can adjust at least one of the power required function 408 and/or the power available function 410 based at least in part on the actual rate of deterioration of the engines 100 of the aircraft 200 for past hover maneuvers performed, and particularly those hover maneuvers performed in a severe operating environment. For example, the machine-learned model 326 can compare the operating conditions present during the current hover maneuver with those operating conditions present during the past hover maneuvers performed, and then can adjust the power required function 408 and/or the power available function 410. That is, the machine-learned model 326 can increase or decrease the slope of the functions 408, 410 in accordance with how the engines 100 have actually deteriorated in the past.

Moreover, the machine-learned model 326 can also make adjustments based upon the initial power required data point 403 and/or the initial power available data point 405. In this regard, the initial power available data point 405 can be indicative of whether the engines 100 are relatively "new" engines or relatively "old" engines. Based on the amount of power available 404, the machine-learned model 326 can classify the engine and adjust or determine the power available function 410 during prognostication based at least in part on this classification. The initial power required data point 403 can be used to determine the amount of stress being placed on the engines 100 during the current hover maneuver. Based on this data, the machine-learned model 326 can be used to adjust, determine, or tailor the power required function 408 during prognostication based at least in part on the initial power required data point 403, that is, how much power is required by the aircraft initial to perform the hover maneuver.

The machine-learned model 290 can use any suitable machine learning technique to determine or adjust the power required function 408 and/or the power available function 410 during prognostication. For example, machine-learned model 290 can include a machine or statistical learning model structured as one of a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model, a k-means model, or a combination of one or more of the foregoing. Other suitable types of machine or statistical learning models are also contemplated. It will also be appreciated that the machine-learned model 290 can use certain mathematical methods alone or in combination with one or more machine or statistical learning models to determine or adjust the power required function 408 and/or the power available function 410 during prognostication.

As further shown in FIG. 5, once the hover time remaining 194 is determined, the hover time remaining 194 can be communicated to a pilot or aircrew member such that the pilot or aircrew member can execute or adapt their mission accordingly. As described above, the hover time remaining 194 can be communicated by any suitable method, including by the communication device 240 as shown in FIG. 4.

In some embodiments, particularly where the aircraft is operating on an automated flight plan, once the hover time remaining 194 is determined and output from the hover time model 320 as shown in FIG. 5, the hover time remaining 194 can be routed or sent to a flight control system 450 instead of or in addition to the communication device 240. The flight control system 450 can be located onboard the aircraft 200, off board, or partially onboard and partially off board the aircraft 200. The flight control system 450 can receive or otherwise obtain the hover time remaining 194, and can use the hover time reaming 194 to make mission decisions, such as e.g., modify how long the aircraft remains in a hover maneuver. In this way, an aircraft operating on an automated flight plan can abort a hover maneuver or otherwise make real time modifications to the flight path based on the hover time remaining 194 indication.

Figure 7:
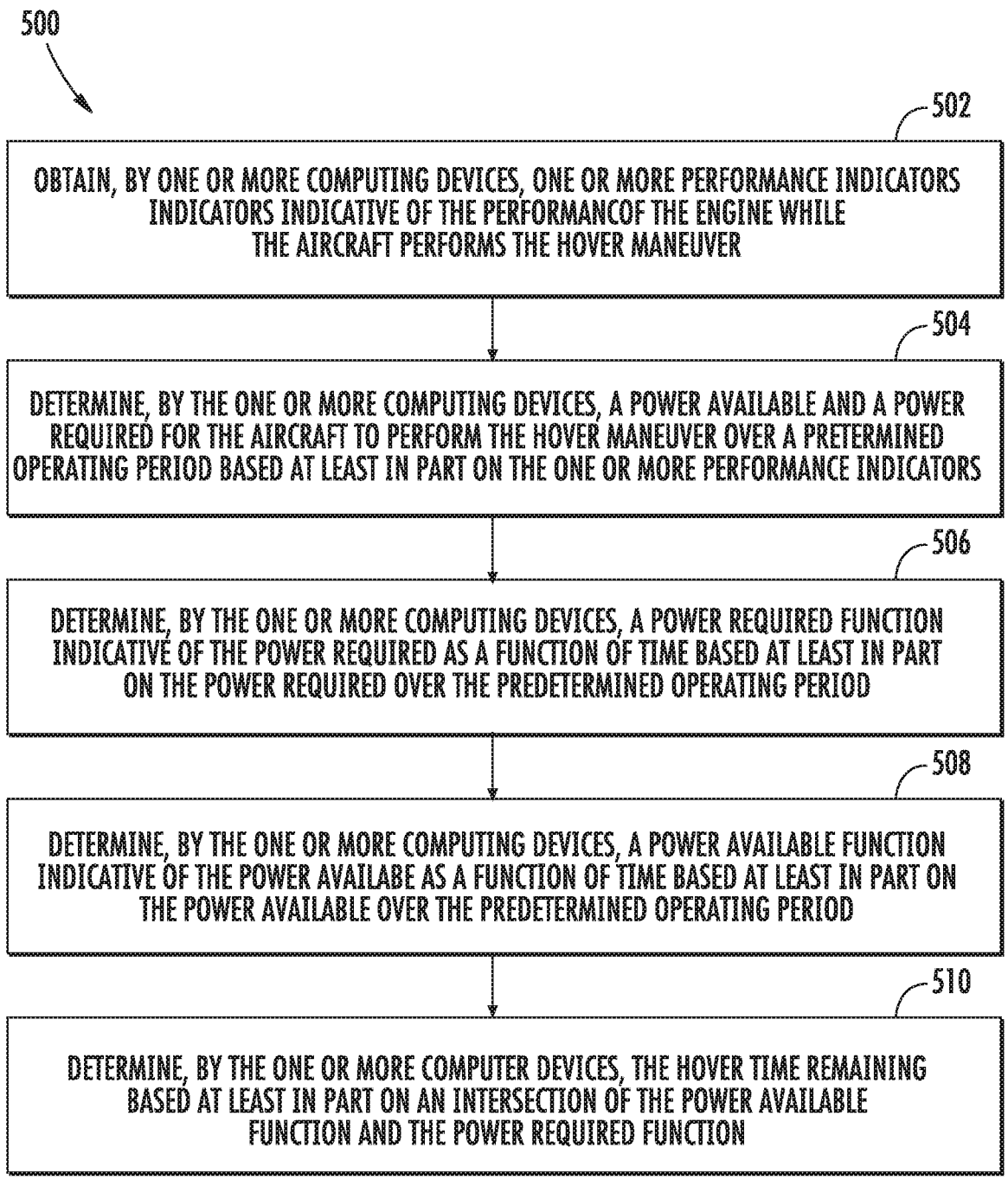
FIG. 7 provides an exemplary flow diagram according to an exemplary embodiment of the present disclosure.

FIG. 7 depicts a flow diagram of an exemplary method (500) for determining a hover time remaining according to an exemplary embodiment of the present disclosure. Some or all of the method (500) can be implemented by aircraft system 400 disclosed herein. Some or all of the method (500) can be performed onboard the aircraft 200, or alternatively, some or all of the method (500) can be performed off board of the aircraft 200. In addition, FIG. 7 depicts method (500) in a particular order for purposes of illustration and discussion. It will be appreciated that exemplary method (500) can be modified, adapted, expanded, rearranged and/or omitted in various ways without deviating from the scope of the present subject matter.

At (502), exemplary method (500) includes obtaining, by one or more computing devices 302, one or more performance indicators 196 indicative of the performance of the engine 100 while the aircraft 200 performs the hover maneuver. As an example, the performance indicators 196 can be obtained by one of the computing devices 302 of the aircraft computing system 300.

At (504), exemplary method (500) includes determining, by the one or more computing devices 302, the power available 404 and the power required 402 for the aircraft 200 to perform the hover maneuver over a predetermined operating period 406 based at least in part on the one or more performance indicators 196. As the aircraft 200 performs the hover maneuver, the performance indicators 196 are routed to one of the computing devices 302 such that the power required 402 and the power available 404 can be determined by the engine performance model 322. The power required 402 and the power available 404 (i.e., the performance data) can then be plotted over the predetermined operating period 406 as shown in FIG. 6.

At (506), exemplary method (500) includes determining, by the one or more computing devices 302, a power required function 408 indicative of the power required 402 as a function of time based at least in part on the power required 402 over the predetermined operating period 406. By way of example, the power required function 408 can be determined by the PHM model 324 by prognosticating or trending the power required 402 over time based upon the trends identified over the predetermined operating period 406.

At (508), exemplary method (500) includes determining, by the one or more computing devices 302, a power available function 410 indicative of the power available 404 as a function of time based at least in part on the power available 404 over the predetermined operating period 406. By way of example, the power available function 410 can be determined by the PHM model 324 by prognosticating or trending the power available 404 over time based upon the trends identified over the predetermined operating period 406.

At (510), exemplary method (500) includes determining, by the one or more computing devices 302, the hover time remaining 194 based at least in part on an intersection 412 of the power available function 410 and the power required function 408.

In some exemplary implementations, the method (500) further includes communicating the hover time remaining 194. By way of example, the hover time remaining can be communicated by an audible communication or by a timer instrument 242 positioned within the cockpit 204 of the aircraft 200.

In some exemplary implementations, the power required function 408 is determined at least in part by a best fit line 416 over at least a portion of the power required 402 data points determined over the predetermined operating period 406. Additionally, the power available function 410 is determined at least in part by a best fit line 418 over at least a portion of the power available 404 data points determined over the predetermined operating period 406.

In some exemplary implementations, the power available function 410 is determined at least in part by determining the rate of change or deterioration of the power available 404 over at least a portion of the power available 404 data points determined over the operating period 406. In some implementations, the power available function 410 is determined at least in part by determining the rate of change of the power available 404 over the power available 404 data points determined for the entire predetermined operating period 406.

In some exemplary implementations, the power required function 408 is determined at least in part by determining the rate of change of the power required 402 over at least a portion of the power available 402 data points determined over the operating period 406. In some implementations, the power required function 408 is determined at least in part by determining the rate of change of the power required 402 over the power required 402 data points determined for the entire predetermined operating period 406.

In some exemplary implementations, the method (500) further includes routing or sending the hover time remaining 194 to a flight control system 450. In this way, the hover time remaining 194 can be used to alter or modify a flight plan of an aircraft 200 performing a hover maneuver.

In some exemplary implementations, the performance indicators 196 include at least on of an engine torque (Q), a power shaft speed (Np), a gas generator shaft speed (Ng), a compressor discharge pressure (P3), a power turbine inlet temperature (T45), and a power turbine outlet temperature (T5). In some embodiments, the performance indicators include an engine torque (Q) and at least one of a power shaft speed (Np) and a gas generator shaft speed (Ng).

In some exemplary implementations, the power available function 410 is determined based at least in part by the machine-learned model 326, wherein the machine-learned model 326 adjusts the power available function 410 based at least in part on the actual rate of deterioration of the engines 100 of the aircraft 200 for past hover maneuvers performed. In some exemplary implementations, the machine-learned model 326 adjusts the power available function 410 based at least in part on past flight history. In some exemplary implementations, the machine-learned model 326 adjusts the power available function 410 based at least in part on a classification of the engine (e.g., whether the engine is "new" or "old" or some other classification).

In some exemplary implementations, the power required function 408 is determined based at least in part by the machine-learned model 326, wherein the machine-learned model 326 adjusts the power required function 408 based at least in part on past flight history. In some exemplary implementations, the machine-learned model 326 adjusts the power required function 408 based at least in part on a classification of the engine (e.g., whether the engine is "new" or "old" or some other classification).

Figure 8:
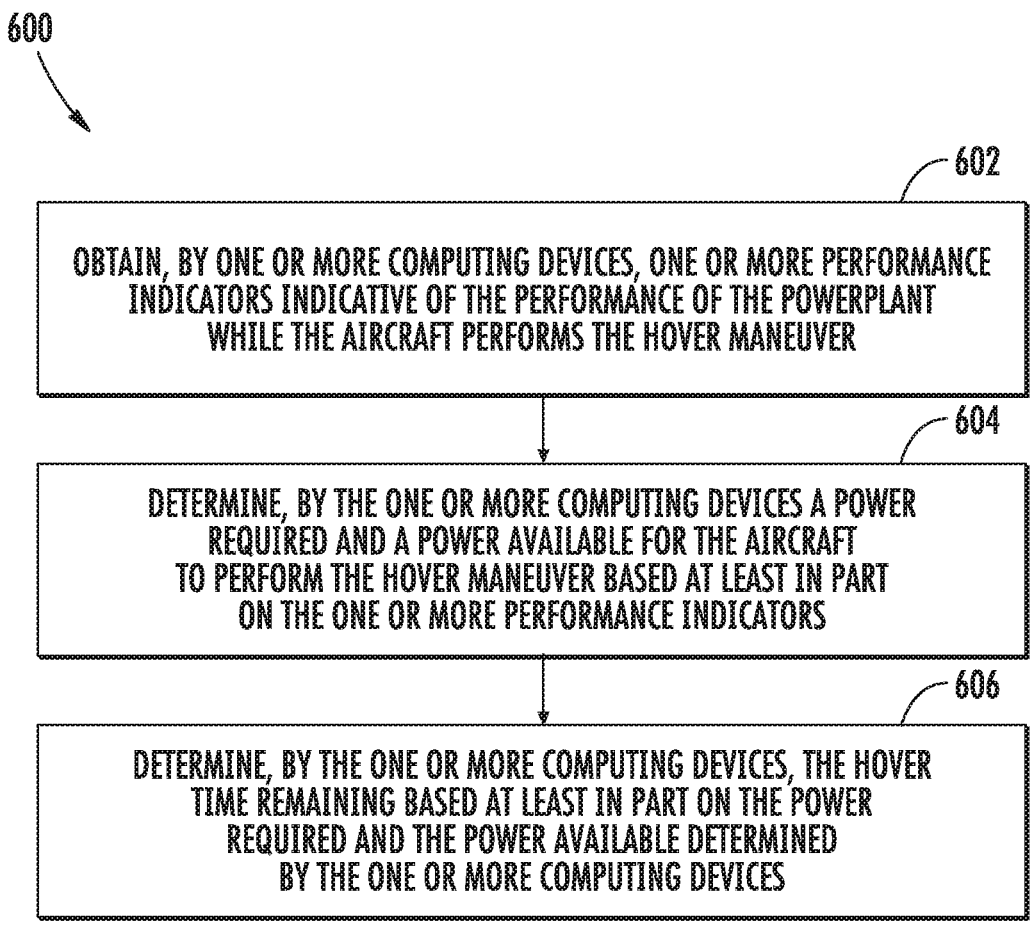
FIG. 8 provides another exemplary flow diagram according to an exemplary embodiment of the present disclosure.

FIG. 8 depicts a flow diagram of an exemplary method (600) for determining a hover time remaining according to an exemplary embodiment of the present disclosure. Some or all of the method (600) can be implemented by aircraft system 400 disclosed herein. Some or all of the method (600) can be performed onboard the aircraft 200, or alternatively, some or all of the method (500) can be performed off board of the aircraft 200. In addition, FIG. 8 depicts method (600) in a particular order for purposes of illustration and discussion. It will be appreciated that exemplary method (600) can be modified, adapted, expanded, rearranged and/or omitted in various ways without deviating from the scope of the present subject matter.

At (602), exemplary method (600) includes obtaining, by one or more computing devices 302, one or more performance indicators 196 of the powerplant while the aircraft 200 performs the hover maneuver. The powerplant can include the gas turbine engines 100 described herein or any other suitable type of propulsion device, such as e.g., a piston-driven combustion engine, a hybrid electric propulsion system, or an electric propulsion system, for example.

At (604), exemplary method (600) includes determining, by the one or more computing devices 302, the power available 404 and the power required 402 for the aircraft 200 to perform the hover maneuver based at least in part on the one or more performance indicators 196.

At (606), exemplary method (600) includes determining, by the one or more computing devices 302, the hover time remaining based at least in part on the power available 404 and the power required 402 determined by the one or more computing devices 302.

In some exemplary implementations, all or some of the parts described above with reference to method (500) can be implemented with respect to method (600).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining a hover time remaining for an aircraft configured to perform a hover maneuver, the aircraft comprising a powerplant, the method comprising:
    obtaining, by one or more computing devices, one or more performance indicators indicative of the performance of the powerplant while the aircraft performs the hover maneuver;
    determining, by the one or more computing devices, a power required and a power available for the aircraft to perform the hover maneuver based at least in part on the one or more performance indicators; and
    determining, by the one or more computing devices, the hover time remaining based at least in part on the power required and the power available determined by the one or more computing devices, the hover time remaining being determined as a unit of time and indicating a time remaining from a current time to a time at which the hover maneuver is to be aborted.

2. The method of claim 1, wherein the method further comprises:
    communicating the hover time remaining as the unit of time.

3. The method of claim 2, wherein the hover time remaining is communicated by an audible communication.

4. The method of claim 2, wherein the hover time remaining is communicated by a timer instrument.

5. The method of claim 1, wherein the power required and the power available for the aircraft to perform the hover maneuver are determined over a predetermined operating period.

6. The method of claim 5, wherein the method further comprises:
    determining, by the one or more computing devices, a power required function indicative of the power required as a function of time based at least in part on the power required over the predetermined operating period;
    determining, by the one or more computing devices, a power available function indicative of the power available as a function of time based at least in part on the power available over the predetermined operating period; and
    wherein, during determining the hover time remaining, the hover time remaining is determined based at least in part on an intersection of the power available function and the power required function.

7. The method of claim 6, wherein the power required function is determined at least in part by a best fit line over at least a portion of the power required determined over the operating period and wherein the power available function is determined at least in part by a best fit line over at least a portion of the power available determined over the operating period.

8. The method of claim 1, wherein the method further comprises:
    routing the hover time remaining to a flight control system.

9. A method for determining a hover time remaining for an aircraft configured to perform a hover maneuver, the aircraft comprising one or more engines, the method comprising:
    obtaining, by one or more computing devices, one or more performance indicators indicative of the performance of the engine while the aircraft performs the hover maneuver;
    determining, by the one or more computing devices, a power available and a power required for the aircraft to perform the hover maneuver over a predetermined operating period based at least in part on the one or more performance indicators;
    determining, by the one or more computing devices, a power required function indicative of the power required trended as a function of time from a current time into the future based at least in part on the power required over the predetermined operating period;
    determining, by the one or more computing devices, a power available function indicative of the power available trended as a function of time from the current time into the future based at least in part on the power available over the predetermined operating period; and
    determining, by the one or more computing devices, the hover time remaining based at least in part on an intersection of the power available function and the power required function once the aircraft generally transitions from directional movement to the hover maneuver.

10. The method of claim 9, wherein the method further comprises:
    communicating the hover time remaining.

11. The method of claim 9, wherein the method further comprises:
    routing the hover time remaining to a flight control system.

12. The method of claim 9, wherein the hover time remaining is a time period spanning from the current time to a time at which the power available function and the power required function intersect.

13. The method of claim 9, wherein the power required function is determined at least in part by a best fit line over at least a portion of the power required determined over the operating period and wherein the power available function is determined at least in part by a best fit line over at least a portion of the power available determined over the operating period.

14. The method of claim 9, wherein the power available function is determined based at least in part by a machine-learned model, wherein the machine-learned model adjusts the power available function based at least in part on the actual rate of deterioration of the engines of the aircraft for past hover maneuvers performed.

15. An aircraft system for an aircraft configured for performing a hover maneuver, the aircraft comprising one or more engines, the aircraft system comprising:
one or more aircraft sensors for sensing one or more performance indicators indicative of the performance of the one or more engines while the aircraft performs the hover maneuver, the performance indicators including a measurement of a turbine temperature versus a turbine temperature limit;
an aircraft computing system comprising one or more computing devices, the one or more computing devices comprising one or more processors and one or more memory devices, the one or more memory devices storing instructions that when executed by the one or more processors cause the one or more processors to perform operations, the one or more computing devices configured to:
obtain the one or more performance indicators;
determine a power required and a power available for the aircraft to perform the hover maneuver;
prognosticate the power required as a function of time from a current time into the future to determine a power required function;
prognosticate the power available as a function of time from the current time into the future to determine a power available function; and
determine the hover time remaining based at least in part on an intersection of the power available function and the power required function.

16. The aircraft system of claim 15, wherein the aircraft system further comprises:
a communication device for communicating the hover time remaining; and
wherein the one or more computing devices are further configured to route one or more signals indicative of the hover time remaining to the communication device.

17. The aircraft system of claim 15, wherein the aircraft includes an airframe defining a cockpit, wherein the communication device is a timer instrument positioned within the cockpit.

18. The aircraft system of claim 15, wherein at least one of the one or more computing devices of the aircraft computing system includes a hover time remaining model, the hover time remaining model including an engine performance model and a prognosticating health model; wherein, during prognostication of the power available and the power required, the power available function and the power required function are determined by the hover time remaining model.

19. The aircraft system of claim 15, wherein the power available function is determined based at least in part by a prognosticating health monitoring model, wherein the prognosticating health model is based at least in part on a long-term engine health model.

20. The aircraft system of claim 15, wherein the power required function is determined at least in part by a best fit line over at least a portion of the power required determined over the predetermined operating period and wherein the power available function is determined at least in part by a best fit line over at least a portion of the power available determined over the predetermined operating period.

* * * * *